United States Patent [19]

Iwasyk

[11] Patent Number: 5,506,336

[45] Date of Patent: Apr. 9, 1996

[54] CONTINUOUS PROCESS FOR PREPARING A SYNTHETIC LINEAR, FIBER-FORMING POLYAMIDE

[75] Inventor: John M. Iwasyk, Wilmington, Del.

[73] Assignee: E. I. Du Pont de Nemours and Company, Wilmington, Del.

[21] Appl. No.: 346,959

[22] Filed: Nov. 30, 1994

Related U.S. Application Data

[62] Division of Ser. No. 85,850, Jun. 30, 1993, Pat. No. 5,411,710.

[51] Int. Cl.$^6$ .......................... C08G 69/26; C08G 69/28
[52] U.S. Cl. .......................... 528/335; 264/101; 264/349; 528/310; 528/323; 528/336
[58] Field of Search .................. 528/335, 336; 264/101, 349

[56] References Cited

U.S. PATENT DOCUMENTS

| | | | |
|---|---|---|---|
| 2,361,717 | 10/1944 | Taylor | 260/78 |
| 2,689,839 | 9/1954 | Heckert | 260/37 |
| 2,804,379 | 8/1957 | Wistrich | 23/270.5 |
| 3,087,435 | 4/1963 | Boucher | 103/89 |
| 3,113,843 | 12/1963 | Li | 23/285 |
| 3,134,655 | 5/1964 | Boucher | 55/52 |
| 3,253,892 | 5/1966 | Brignoc et al. | 422/137 |
| 3,361,537 | 1/1968 | Ferrante | 23/283 |
| 3,473,896 | 10/1969 | Halder et al. | 23/285 |
| 3,717,330 | 2/1973 | Pinney | 259/6 |
| 3,778,974 | 12/1973 | Iwasyk | 55/199 |
| 3,789,584 | 2/1974 | Iwasyk et al. | 55/201 |
| 3,822,999 | 7/1974 | Pope | 23/270.5 |
| 3,877,881 | 4/1975 | Ono et al. | 366/323 |
| 3,900,450 | 8/1975 | Jaswal et al. | 260/78 R |
| 3,947,424 | 3/1976 | Tomek | 260/45.75 C |
| 3,948,862 | 4/1976 | Iwasyk | 260/78 R |
| 4,007,016 | 2/1977 | Weber | 23/285 |
| 4,090,261 | 5/1978 | Iwasyk | 366/83 |
| 4,134,736 | 1/1979 | Hammond, Jr. | 159/3 |
| 4,212,847 | 7/1980 | Volmer et al. | 422/135 |
| 4,370,061 | 1/1983 | Livingston | 366/85 |
| 4,460,278 | 7/1984 | Matsubara et al. | 366/149 |
| 5,152,971 | 10/1992 | Bertrand et al. | 422/135 |
| 5,182,087 | 1/1993 | Lilja et al. | 422/229 |
| 5,188,808 | 2/1993 | Lilja et al. | 422/229 |
| 5,403,910 | 4/1995 | Kosinski et al. | 528/336 |
| 5,411,710 | 5/1995 | Iwasyk | 422/137 |

FOREIGN PATENT DOCUMENTS

| | | | |
|---|---|---|---|
| 1479763 | 5/1967 | France. | |
| 3640052C1 | 4/1988 | Germany | B01F 7/24 |
| 3710965A1 | 10/1988 | Germany | B01F 3/12 |
| 92/17272 | 10/1992 | WIPO | B01F 7/24 |

*Primary Examiner*—Morton Foelak

[57] ABSTRACT

The present invention relates to an apparatus for processing materials, a process for mixing, finishing and de-volatizing polyamide to make 66 nylon and the 66 nylon made by this process. The apparatus comprises an agitator section having an outlet adjacent the bottom thereof; a transfer screw disposed adjacent the outlet of the agitator section; a spiral ribbon extending upwardly from the transfer screw; a ring disposed vertically above the spiral ribbon, at least one baffle disposed vertically above the spiral ribbon and connected to the ring and a wall-wiping spur connected to the ring. Preferably, the apparatus has two baffles—an upper one for pumping the material downwardly and a lower one for pumping the material upwardly. The diameter of each baffle is preferably about 80% of the diameter of the agitator section.

3 Claims, 4 Drawing Sheets

CONTINUOUS PROCESS FOR PREPARING A SYNTHETIC LINEAR, FIBER-FORMING POLYAMIDE

This is a division of application Ser. No. 08/085,850, filed Jun. 30, 1993, now U.S. Pat. No. 5,411,710.

BACKGROUND OF THE INVENTION

1. Field of the Invention

The present invention relates to an apparatus for processing at least one material, and is particularly suited for mixing, finishing and de-volatizing polymers.

2. Description of the Related Art

The commercial preparation of most linear condensation polymers, such as polyamides or polyesters, typically involves heating monomeric starting materials to cause progressive condensation of the polymers. This process is usually carried out in several stages, with the intermediate formation of low-molecular weight, low viscosity polymeric liquid by the removal of volatiles. The low-molecular weight, low-viscosity polymeric liquid then passes through a finishing zone which is controlled at various vacuum and residence times and temperatures to allow the polymer to reach the desired final molecular weight and viscosity.

Undesirable side reactions, such as thermal degradation and discoloration of polymers in polymerization equipment can occur in the preparation of polymers. Such side reactions have long been recognized in the field of polymer processing. Finishers such as those described in U.S. Pat. No. 3,361,537 to Ferrante and U.S. Pat. No. 4,134,736 to Hammond have produced polymers of uniform viscosity, with less thermal degradation, discoloration and gel build-up than finishers which had been previously available.

Separators have also been used in the art of polymer processing for producing polymers of lower molecular weight than finishers produce. Separators are devices which operate at one atmosphere, while finishers operate at one atmosphere or lower with vacuum. It is known to operate a polymerization device as both a separator and a finisher, as exemplifed by U.S. Pat. No. 3,717,330 to Pinney. It is also known in the art to provide a separator which comprises a spiral ribbon extending upwardly from a transfer screw and a ring disposed above the spiral ribbon, as described in U.S. Pat. No. 3,087,435 to Boucher, with baffles which are connected to a plurality of spokes attached to the transfer screw and disposed below the ring. These baffles have a helical shape and have holes formed therein, and always pump downwardly. The use of a baffle in a reactor, or finisher, is also disclosed in U.S. Pat. No. 4,460,278 to Matsubara et al., U.S. Pat. No. 4,007,016 to Weber, U.S. Pat. No. 3,822,999 to Pope and U.S. Pat. No. 2,804,379 to Wistrich et al.

A major design consideration in polymerizing equipment is flow pattern, which influences final polymer color and quality. Areas of stagnation or channeling are known flow problems and are indicative of non-ideal flow. Ideally, the polymer should flow through a series of several well-mixed stages throughout its residence time in the equipment, while maintaining plug-flow, i.e., substantially uniform liquid flow velocities of all the polymer in a given transverse cross-section of the equipment. The separators and finishers described above do not provide uniform mixing and ideal flow conditions. Also, these finishers and separators exhibit significant gel formation above the surface of the polymer and thermal degradation of the polymer.

As demand increases for polymers of higher molecular weight and for more flexible polymer producing operations with higher throughputs, neither the separators nor the finishers as described above are able to produce desired polymers. With such desired higher molecular-weight polymers and higher throughputs, gel, color and other polymer quality specifications such as thermal degradation index and oxidative degradation index become an increasing problem. To achieve the increased throughput, larger finishers or separators are required. To achieve higher molecular weight, higher viscosity polymer must be processed. The larger finishers or separators and the higher-viscosity polymers require increased power, which results in increased energy input. This increased energy requirement is obviously undesirable from an economic standpoint, and has the additional disadvantages of requiring stronger structures for the finishers or separators and overheating the polymer in the finisher, ultimately resulting in a thermally degraded, inferior product.

SUMMARY OF THE INVENTION

The present invention solves the problems associated with the prior art by providing an apparatus for processing at least one material which is particularly useful as a mixer for mixing polymer, and/or as a finisher for preparing high molecular weight, high-viscosity polymer and/or as a de-volatizer for removing volatiles from the polymer.

The present invention also solves the problems associated with the prior art by providing an apparatus which minimizes the energy input and cost required to operate the apparatus, and which has maximized mechanical strength.

The present invention also solves the problems associated with the prior art by providing an apparatus which reduces gel formation.

The present invention also solves the problems associated with the prior art by providing an apparatus which provides uniform mixing and prevents excessive channeling and stagnation of the material.

In order to achieve the foregoing solutions, in accordance with the present invention, there is provided an apparatus for processing at least one material. The apparatus comprises an agitator section having an outlet adjacent the bottom thereof; a transfer screw disposed adjacent the outlet of the agitator section; a spiral ribbon extending upwardly from the transfer screw; a ring disposed vertically above the spiral ribbon; and at least one baffle disposed vertically above the spiral ribbon and connected to the ring.

Further in accordance with the present invention, it is preferable that the at least one baffle comprises a first baffle for pumping the material downwardly, and a second baffle disposed below the first baffle for pumping the material upwardly. It is further preferable that the diameter of the first and second baffles is about 80% the diameter of the agitator section.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the present preferred embodiments of the invention as illustrated in the accompanying drawings.

In accordance with the present invention, there is provided an apparatus for processing at least one material. The apparatus of the present invention is shown generally at 10 in FIGS. 1 and 2. "Processing" may mean mixing, or alternatively, or in addition, finishing, (i.e., producing a reaction and converting a low viscosity material to a high viscosity material), or alternatively, or in addition, de-volatizing (i.e., stripping out gas) in a material. The apparatus of the present invention may process either one material or a mixture of materials, at least one of which is a liquid. In general, the apparatus of the present invention is ideal for handling a foamy material. Materials suitable for mixing and finishing with the apparatus of the present invention include 6 nylon, whereby water and caprolactan are removed, 6,6 nylon, whereby water is removed, polyarylates, whereby acetic acid and phenol is removed and polyesters, where glycols are removed. A material suitable for mixing and de-volatizing with the apparatus of the present invention includes polyethylene, whereby ethylene gas is removed.

Figure 1:
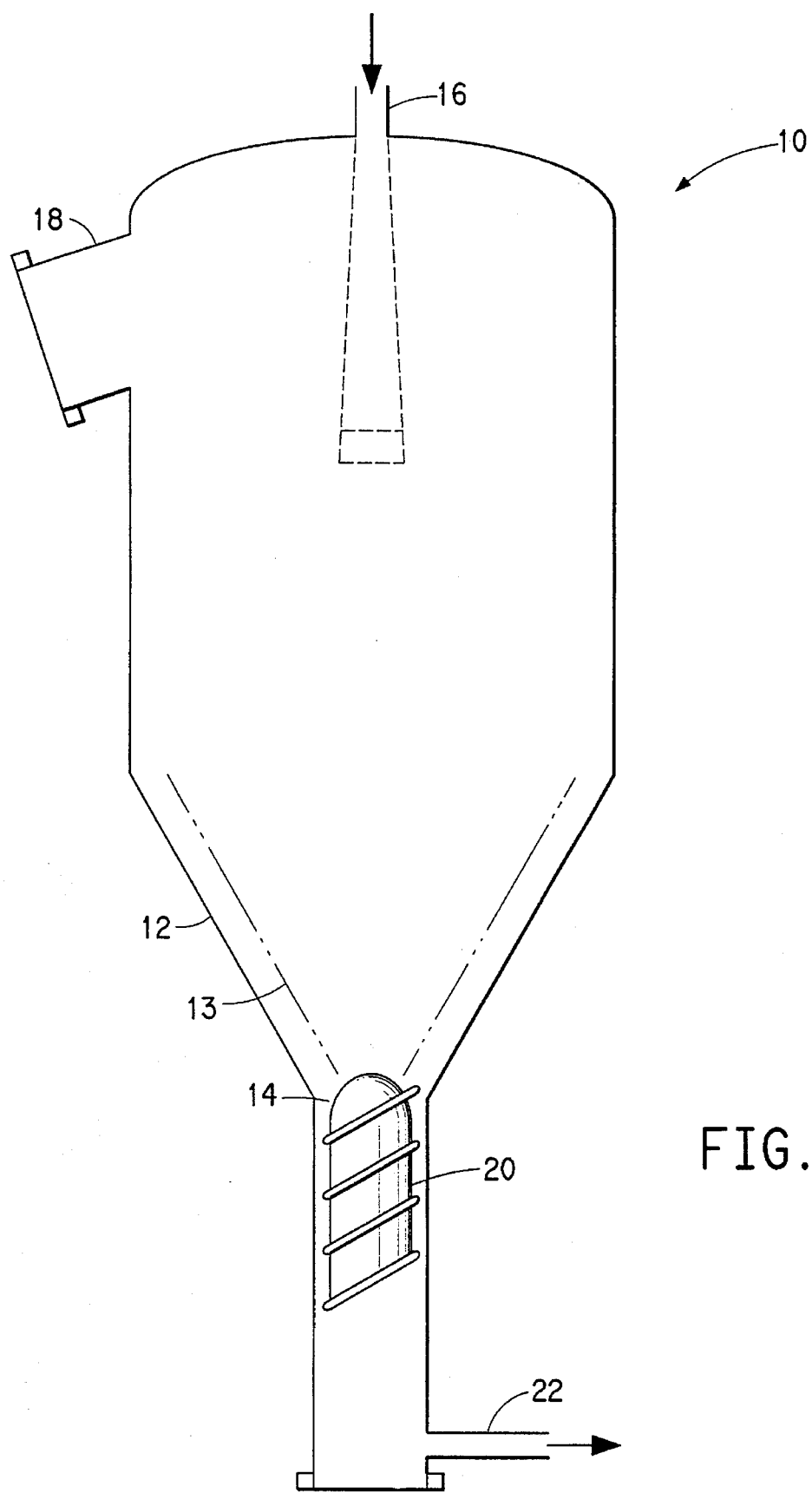
FIG. 1 is an elevational view of the apparatus of the present invention.
Figure 2:
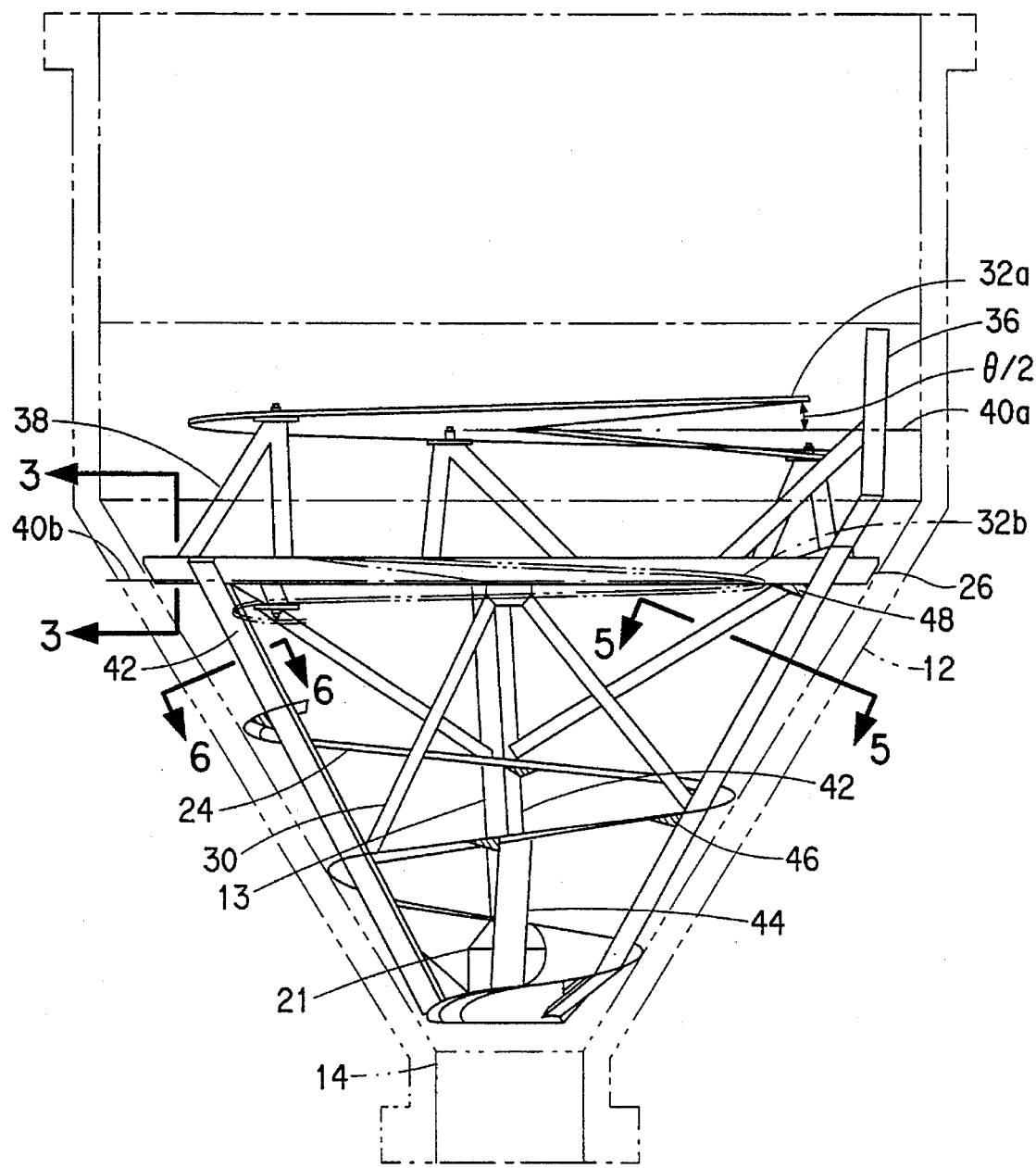
FIG. 2 is a cut away, elevational view of the apparatus of FIG. 1, showing the agitator section and the top of the transfer screw.

The apparatus of the present invention comprises an upright tubular agitator section 12 as shown in FIGS. 1 and 2 having an outlet 14 adjacent the conically-shaped bottom of the agitator section. Material enters the apparatus at the top thereof, usually through a central nozzle 16 as shown in FIG. 1, as indicated by the arrow going into the nozzle. Alternately, several entry nozzles may be employed. When the apparatus of the present invention is used as a finisher or a de-volatizer, by-product gas from the nozzle or from the material flows upwardly and out through a vent 18. A transfer screw 20 is disposed adjacent the outlet of the agitator section as shown in FIG. 1. Transfer screw 20 extends through the bottom of the agitator section and terminates in an auger screw element 21 as shown in FIG. 2, which may have one or more turns. The purpose of the transfer screw is to remove the material from the apparatus and transport it to a downstream transfer line 22 as indicated by the arrow in line 22 and then to a gear pump, not shown. Further downstream operations, such as spinning and casting, may then be performed on the material. Agitator section 12 has an agitator 13 as shown by the dashed lines in FIG. 1 which extends upwardly from the transfer screw and is driven thereby. The agitator section is joined to the transfer screw by a key and screw joint (not shown), allowing ease of disassembly for routine maintenance. It is of course within the scope of the present invention to use other attachment mechanisms between the agitator section and the transfer screw.

A spiral ribbon 24 extends upwardly from the transfer screw as shown in FIG. 2. Spiral ribbon 24 mixes the material in the lower portion of the agitator section. It blends out any non-uniformities generated by upstream process upsets, so that very uniform material is fed to downstream operations. The spiral ribbon also wipes the walls of the agitator section, thus preventing gel build-up. Furthermore, the geometry of the spiral ribbon within the agitator section encourages downward pumping of the material, further enhancing the gel-inhibiting characteristics of the ribbon and thus the quality of the material. For very large apparatus, for example when the agitator section diameter is greater than 50 inches, the horsepower requirement to rotate the ribbon becomes unreasonably high. This excessive horsepower requirement causes the temperature of the material to increase, resulting in thermal degradation. Therefore, for large apparatus, it is preferred to limit the spiral ribbon to be disposed below the 50 inch diameter portion of the agitator section. For small apparatus, where the horsepower requirement is less of a concern, it may be preferred to allow the ribbon to extend through the entire material zone in the agitator section.

Figure 3:
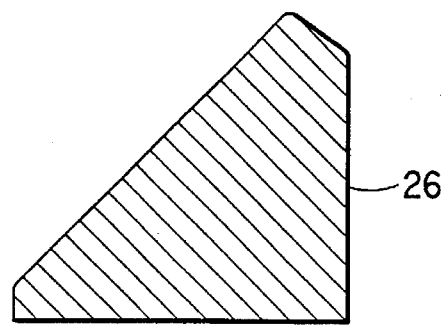
FIG. 3 is a cross-sectional view, taken across lines 3—3 of FIG. 2, of the ring of the apparatus of the present invention.

A ring 26 is disposed vertically above the spiral ribbon. The ring provides mechanical integrity to the entire agitator section. The preferred cross-section of the ring is wedge-shaped on the top, as can be seen from FIG. 3. The advantage of providing a wedge-shaped cross section is that the material flows over the wedge and does not stagnate there, which would result in gel formation.

Figure 5:
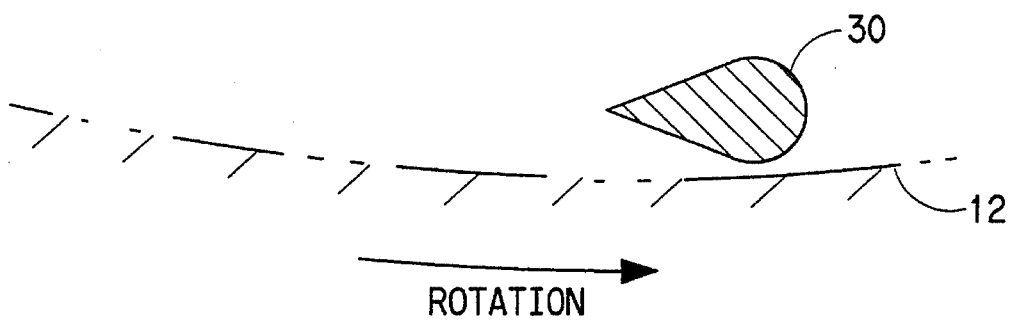
FIG. 5 is a cross-sectional view, taken across lines 5—5 of FIG. 2, showing the diagonal supports of the apparatus having a generally tear-drop shape according to one embodiment of the present invention.

A plurality of diagonal supports 30 as shown in FIG. 2 connect the spiral ribbon to the ring. The supports are welded to the ribbon and the ring, although other attachment methods may be chosen. The diagonal supports may have a generally tear-drop shape, as shown in FIG. 5. A tear-drop shape enables the laminar flow of the material to flow in a stream line with respect to the walls of the agitator section. This eliminates stagnant or void zones, which lead to gel formation. The diagonal supports are provided for additional mechanical strength to avoid twisting and distortion of the agitator section. For low-viscosity applications, these diagonal supports may be unnecessary. However, when used, the diagonal supports must be located in positions that will not contribute to gel build-up or cause improper flow patterns, such as channeling.

The apparatus of the present invention further comprises at least one baffle disposed vertically above the spiral ribbon and connected to the ring. The apparatus further includes a plurality of baffle support members 38 for connecting the baffle to the ring. Each baffle is bolted a baffle support member. The at least one baffle comprises a first, or upper, baffle 32a for pumping the low-viscosity material downwardly. Upper baffle 32a serves several purposes. Incoming material drops down and encounters baffle 32a and is radially distributed, resulting in an improved flow pattern within the apparatus. Without a baffle, the material would tend to channel down through the material in the agitator section, the outer region would stagnate and severe degradation would result. In addition, gel stalactites often form on the apparatus. As the stalactites become heavier, they eventually drop off, into the material. The upper baffle catches these stalactites and acts as a filter, not allowing them to pass into the downstream processes, which causes severe problems. In polymerizing processes that cause foam formation, such as nylon polymerization, the upper baffle is designed to pump downwardly and thereby serves the purpose of pumping the contents of the apparatus downwardly and compressing the foam formed during the polymeric reaction.

The at least one baffle may further comprise at least one second, or lower, baffle 32b, as shown in FIG. 2 by dashed lines, for pumping the material upwardly. Inclusion of lower baffle 32b is preferred, but is not an essential feature of the invention. In contrast to the upper baffle 32a, the helical geometry of the lower baffle causes lower baffle 32a to pump material upwardly, which enhances flow pattern and residence time distribution. In a preferred embodiment, the lower baffle is located eight to twelve inches below the upper baffle. Although only two baffles are illustrated, additional lower baffles for pumping the material upwardly may be added as the apparatus height is increased. For instance, if more than two baffles are used with the present invention, all the lower baffles pump would upwardly and the middle baffle would be oriented 180° from the top baffle. In this case, the upper baffle, such as baffle 32a, would be bolted to the lower baffle, such as 32b.

The diameter of the first and second baffles is in the range of about 50% to 99% of the diameter of the agitator section, measured at the height of the baffle. The upper value for the baffle diameter is limited only by the necessary clearance between the baffle and the wall of the agitator section. Preferably, the diameter of the baffle is preferably about 80% of the diameter of the agitator section, measured at the height of the baffle.

The static level of the material is horizontal at zero rotational speed. Upon rotation the surface of the material assumes the shape of a parabola, in that the material at the wall above the agitator section climbs several inches up the wall and the material at the center of the agitator section drops several inches. In a preferred embodiment, the top of the upper baffle is ideally located four to five inches below the static level of the material to prevent the center of the baffle from becoming dry. If this occurs, then gel will form in the dry area, due to stagnation and degradation.

Figure 4:
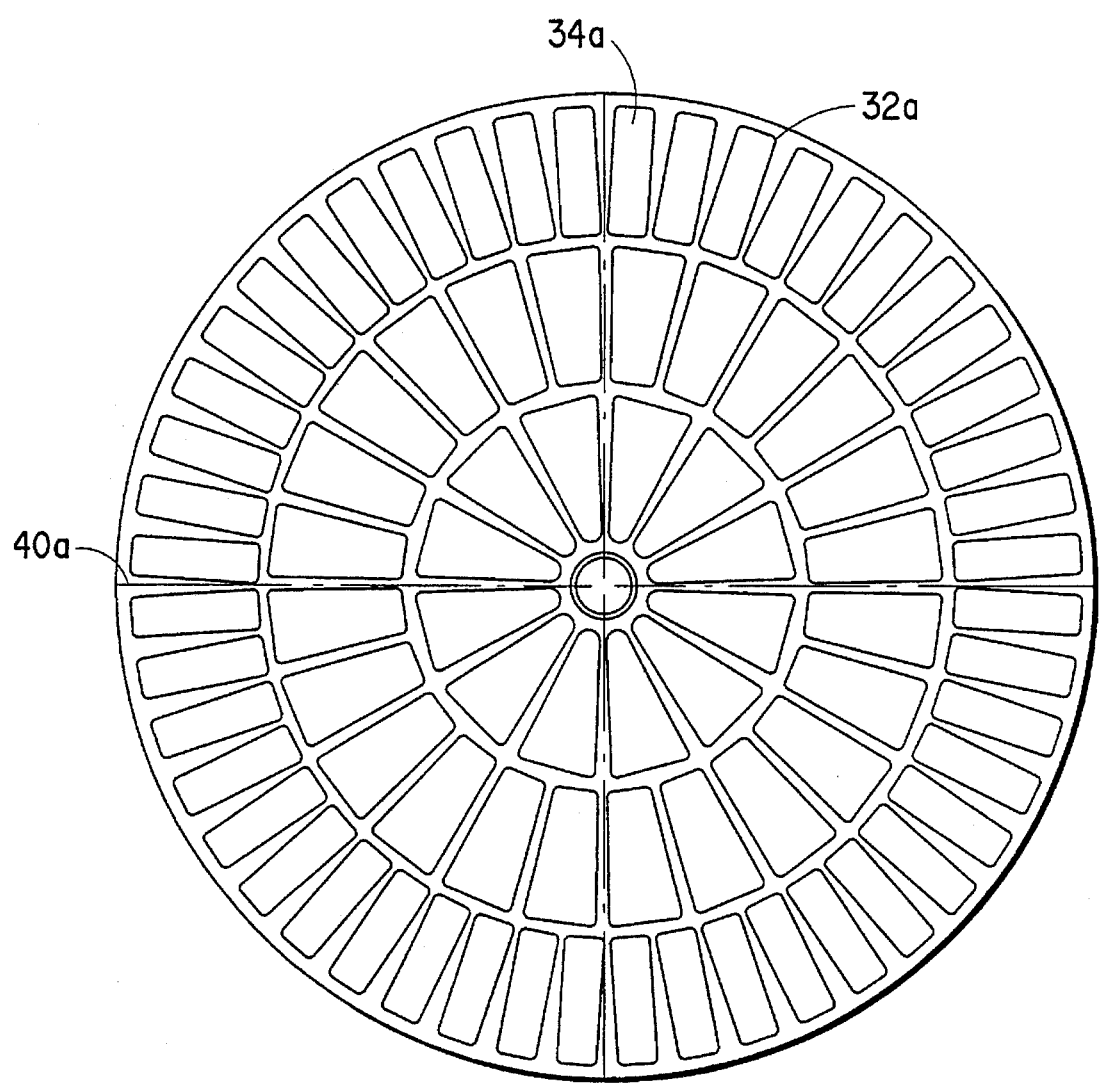
FIG. 4 is a plan view showing a preferred design of the top baffle of the present invention.

Each baffle is made of a corrosion-resistant material, such as metal. It has been found that any solid baffle, made of any material, will cause flow stagnation and polymer degradation. Therefore, each baffle has a plurality of holes formed therein in order to reduce the surface area of the baffle which is exposed to the material being processed. As shown in the top baffle of FIG. 4, a plurality of holes 34a are formed therein, it being understood that similar holes, although not shown, are formed in the bottom baffle. The formation of holes in the baffle prevents stagnation, resulting in better quality material (i.e., one with virtually no gel formation) to a much greater degree than what could be achieved by a baffle with no holes formed therein. The formation of holes in the baffle also creates better flow patterns, i.e., there is very effective pumping of the material across the surface of the baffle, thereby also preventing gel formation. Enough holes may be formed in the baffle so that the material from which the baffle is made may comprise only 5% of its surface area. The holes may be round, or preferably, rectangular as shown in FIG. 4. It has been found that this configuration of rectangular holes as shown in FIG. 4 produces significant lowering of gel deposition on the baffle.

A spur 36 is connected to the ring as shown in FIG. 2. The purpose of spur 36 is to wipe the walls of the agitator section to improve flow patterns by reducing the tendency for the material to create a beach line of gel on the walls above the material surface. Also, by positioning the spur opposite the cut in the baffle as shown in FIG. 2, it provides additional radial mixing and decreases the tendency for stagnation to occur. By canting the spur forward, it can also serve to pump material downwardly. The spur is optional, and may not be required in some polymer applications. However, in the case of the present invention where two or more baffles are used, the spur is necessary to provide radial mixing at the surface of the material, so that the central feed of the material does not channel down through the apparatus. Preferably, the top of the spur is below the surface of the material, preferably about ½ inch, to avoid protrusion above the level of the material, which would provide a dry region on the spur where gel would form. Preferably, the spur is trapezoidal in shape. A trapezoidal shape enables the laminar flow of the material to flow in a stream line with respect to the walls of the agitator section. This eliminates stagnant or void zones, which leads to gel. Although more than one spur may be provided, a single spur has the advantage of minimal power requirements, since spur horsepower is directly proportional to the number of spurs used. The spur may be unbolted from the ring and interchanged with a spur of a different height, so that its height can be easily changed if a change in the level of the material is required. Throughput changes require different hold-up volumes, which are achieved by changing the level of material in the agitator section. Hold-up volume can be adjusted by changing the height of the spur and the number and position of the baffles, which can be changed by unbolting them from the baffle supports as noted above.

Each baffle is cut along a radial line and extends above and below a horizontal plane at an angle, θ/2, so that it has a helical shape as shown in FIG. 2. Various pitches, either right or left handed, may be chosen for the baffles. As shown in particular in FIGS. 2 and 4, the first, or top baffle, is cut along a radial line 40a intersecting the vertical center line of the spur. The second, or bottom, baffle is cut along a radial line 40b which intersects the top end point of the spiral ribbon. The helical shape of the baffles promotes proper flow patterns, by avoiding excessive channeling at the center of the baffle. In addition, the orientation of the helical baffles with respect to each other, when more than one baffle is used, creates compartments of well-mixed flow which move downwardly through the apparatus.

Figure 6:
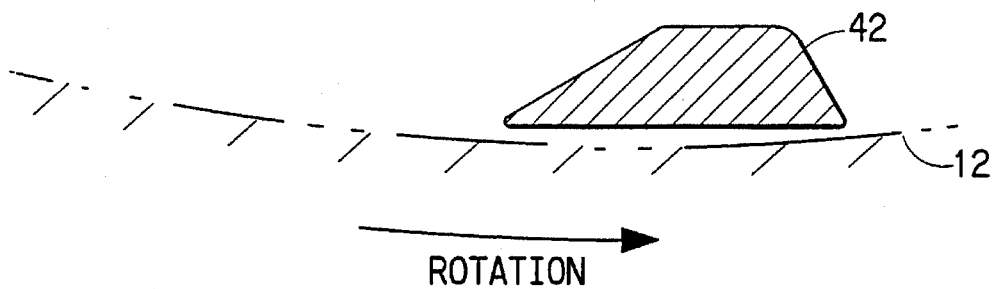
FIG. 6 is a cross-sectional view, taken across lines 6—6 of FIG. 2, showing a major spoke of the apparatus having a generally trapezoidal shape according to a further embodiment of the present invention.

As shown in FIG. 2 in particular, a plurality of radially spaced major spokes 42 extend between the ring and the transfer screw. This configuration of the major spokes is optimal for high viscosity materials. The major spokes are positioned very close to the wall of agitator section 12 to provide wall wiping and reduction of gel at the wall and the supports. The clearance between the major spokes and the agitator section wall can be varied, with the ideal clearance being less than one inch for the preferred embodiment. As can be seen in FIG. 6, the wall side of the major spokes has the same contour as the agitator section wall to avoid gel and reduce inward mechanical pressure which would produce stress on the supports, resulting in failure. It is preferred to use the minimum number of major spokes necessary to achieve the required mechanical stability for a particular application in order to minimize power requirements.

The apparatus of the present invention also includes a plurality of radially spaced minor spokes 44 which extend between the spiral ribbon and the transfer screw. As shown in FIG. 2 in particular, the major and the minor spokes are disposed on the outside of the spiral ribbon. It should be noted that the bafle may alternatively be connected to the spokes below the ring. The major and the minor spokes preferably have a trapezoidal shape, a major spoke being shown in cross-section in FIG. 6. As noted above, a trapezoidal shape enables the laminar flow of the material to flow in a stream line with respect to the walls of the agitator section, thereby eliminating stagnant or void zones, which lead to gel. For applications using materials not subject to gel formation, alternatively, the major and minor spokes may have a tear-drop shape, similar to the tear-drop shape for the diagonal supports as shown in FIG. 4. Since tear-drop shaped spokes cost less to manufacture than trapezoidal spokes, they are preferred for such applications.

The total number of major and minor spokes is strictly a function of the viscosity of the material being processed. For processing materials with low viscosities, say below 50 poise, the apparatus of the present invention needs only three spokes. As the viscosity of the material and the size of the apparatus increases, more spokes are needed. Preferably, the total number of major and minor spokes is six when processing materials with relatively high viscosities.

Preferably, the major and the minor spokes are made of a corrosion-resistant material, such as 300 or 400 series stainless steel. In situations were lower viscosity materials are processed, the entire apparatus may be made from 300 or 400 series stainless steel. However, in situations where higher viscosity materials are processed, the major and minor spokes may be made of 17-4 pH stainless steel, which is an extremely high strength, corrosion resistant material, while the rest of the apparatus can still be made of 300 or 400 series stainless steel.

The apparatus of the present invention may further comprise at least one fillet for filling in an open space in the apparatus with metal, thereby preventing cavitation. A plurality of fillets 46 is shown underneath the spiral ribbon at the joint of the spokes in FIG. 2, while a plurality of fillets 48 is shown below the ring in FIG. 2. Alternatively, or in addition, a fillet may be provided at each location of where the spoke is welded into the ring.

In operation, the material flow through nozzle 16, agitator section 12, transfer screw 20 and out line 22. The apparatus of the present invention produces a series of vertically segmented zones in the material as it flow through the apparatus. The upper vertical zones formed by the baffle allow lower viscosity to be maintained in the upper zones of the apparatus, and higher viscosities to be maintained in the lower zones, near the spiral ribbon. This flow distribution has the advantages of better quality product, i.e., one with virtually no gel or discoloration, greater reaction efficiency (when the apparatus is used as a finisher) and reduced power consumption. Lower power consumption results in lower heat rise in the material and subsequent lower thermal degradation. Also, it has been found that the residence time distribution in the apparatus of the present invention is superior to finishers of the prior art, thus reducing channeling, stagation and gel formation.

A preferred use for the apparatus of the present invention is as a mixer, finisher and de-volatizer in a continuous process for the preparation of a synthetic, linear, fiber-forming polyamide by the melt polymerization of an aqueous solution of a polyamide-forming salt of an aliphatic diamine and a dicarboxylic acid. Thus, in accordance with the present invention, there is provided an improvement in a continuous process for preparing a synthetic, linear, fiber-forming polyamide by the melt polymerization of an aqueous solution of a polyamide-forming salt of an aliphatic diamine and a dicarboxylic acid. The improvement comprises the step of processing the polyamide in an apparatus as described above comprising a transfer screw disposed adjacent an outlet of an agitator section, a spiral ribbon extending upwardly from the transfer screw, a ring disposed vertically above the spiral ribbon and at least one baffle disposed vertically above the spiral ribbon and connected to the ring, to thereby mix, finish and de-volatize the polyamide. The processing step includes the sub-step of vacuum finishing and separating the polyamide in one stage. Most preferred is the use of the apparatus of the present invention as a mixer, finisher and de-volatizer in a continuous process for the preparation of polyhexamethylene adipamide (66 nylon) from an aqueous solution of a hexamethylenediammonium adipate (66 nylon salt). Therefore, in the preferred process of the present invention, the synthetic, linear, fiber-forming polyamide is polyhexamethylene adipamide. The result is polyhexamethylene adipamide made by the process of the present invention.

Test Methods

The following test methods were used to evaluate the 66 nylon finished by finishing apparatus of the prior art and the apparatus of the present invention as described in the Examples below.

Thermal degradation index (TDI) is a measurement that correlates with a polymer's thermal history. A lower TDI indicates less severe temperature history during manufacture. It is determined by measuring the optical absorbance of a 1% (by weight) solution of the polymer in 90% formic acid at 292 nm.

Oxidative degradation index (ODI) is a measurement that correlates with a polymer's exposure to oxidating conditions during its high temperature manufacture. A lower ODI indicates less severe oxidative degradation during manufacture. It is determined by measuring the optical absorbance of a 1% (by weight) solution of the polymer in 90% formic acid at 260 nm.

Relative viscosity refers to the ratio of solution and solvent viscosities measured in a capillary viscometer at 25° C. The solvent is formic acid containing 10% by weight water. The solution is 8.4% by weight polyamide polymer dissolved in the solvent.

General Procedures

A typical reaction system for the preparation of 66 nylon, such as those described in U.S. Pat. No. 3,113,843 to Li and U.S. Pat. No. 3,900,450 to Jaswal et al. and used in the Examples as described below, comprises, sequentially, a reactor stage, a flasher stage, a steam/polymer separator stage and a vacuum finishing stage. The reaction system may be preceded by an evaporator to adjust the concentration of the 66 nylon salt solution prior to the reactor. The apparatus of the present invention as used in Example 3 carried out both the steam/polymer separation, such as in separator 14 of Li, and the vacuum finishing, such as in finisher 16 of Li.

In a typical 66 nylon process, an aqueous solution of hexamethylenediammonium adipate (6,6 nylon salt) varies between 35 and 65% by weight. Strength may be adjusted in the optional evaporator upstream of the reactor stage. The effluent from the flasher stage (which is also referred to as the secondary reactor) comprises polyamide pre-polymer, typically 9–20 RV (relative viscosity). This stream is fed to a finishing apparatus. Control variables in the finishing apparatus are temperature, pressure and hold-up volume. These control variables can be varied such that a final polymer of the desired RV, typically in the range of 30 to 100, is obtained. Temperature in the finishing apparatus is maintained in the range of 270° to 290° C. Pressure is maintained at 250 to 640 millibars. Hold-up volumes are approximately 20 to 40 minutes.

The process and the product of the present invention will be clarified by the following Examples, which are intended to be purely exemplary of the invention.

In Examples 1–3 below, three different reaction systems for the preparation of polyhexamethylene adipadipamide (66 nylon) using finishers are compared. One continuous process for preparing 66 nylon is disclosed in U.S. Pat. No. 3,947,424 to Tomek. This process was carried out in an apparatus for separating a vapor from a viscous material disclosed in U.S. Pat. No. 3,113,843 to Li, as described below in Comparative Example 1. Another continuous process for preparing 66 nylon was carried out in a continuous polymerization system as disclosed in U.S. Pat. No. 3,900,450 to Jaswal et al. Comparative Example 2 used the continuous polymerization system, including rectifying zone 10, first reaction zone 12 of FIG. 1 and flasher 53 of FIG. 3 of Jaswal et al. and a combined separator/finisher such as that shown in U.S. Pat. No. 3,717,330 to Pinney. Example 3 used the continuous polymerization system, including rectifying zone 10, first reacting zone 12 of FIG. 1 of Jaswal et al. and a flashing reactor such as reactor 12 of Li instead of flasher 53 of FIG. 3 of Jaswal et al. and the apparatus of the present invention in place of finisher 64 of Jaswal et al. The apparatus of the present invention was used to mix, finish and de-volatize.

COMPARATIVE EXAMPLE 1

An approximately 50% by weight aqueous solution (as adjusted in an evaporator) of hexamethylenediammonium adipate (6,6 nylon salt), a polyamide-forming salt solution, was fed to a conventional continuous polymerization process similar to the type disclosed in Tomek, except that no additives were employed. The equipment configuration of the polymerization system was as described above. Conditions were adjusted such that final polymer exhibited a relative viscosity (RV) of approximately 50. Quality parameters are shown below in Table 1.

COMPARATIVE EXAMPLE 2

An approximately 50% by weight aqueous solution of hexamethylenediammonium adipate (6,6 nylon salt), a polyamide-forming salt solution was fed to a conventional continuous polymerization process similar to the type disclosed in Tomek, except that no additives were added. The equipment configuration of the polymerization system was as described above. Conditions were adjusted such that final polymer exhibited a relative viscosity (RV) of approximately 50. Quality parameters are shown below in Table 1.

EXAMPLE 3

An approximately 63% by weight aqueous solution of hexamethylenediammonium adipate (6,6 nylon salt), a polyamide-forming salt solution was fed to a conventional continuous polymerization process similar to the type disclosed Tomek, except no additives were used. The equipment configuration of the polymerization system was as described above. Conditions were adjusted such that final polymer exhibited a relative viscosity (RV) of approximately 50. Temperature in the apparatus of the present invention was maintained at a temperature in the range of 270° to 290° C. Pressure was maintained at 250 millibars. Residence time in the apparatus was approximately 30 minutes. The improvements in the 66 nylon product made by the process of the present invention are shown below in Table 1.

TABLE 1

|  | RV | TDI | ODI |
|---|---|---|---|
| Comparative Example 1 | 51.1 | 0.33 | 0.31 |
| Comparative Example 2 | 51.7 | 0.37 | 0.30 |
| Example 3 | 50.9 | 0.32 | 0.24 |

As can be seen from Table 1, when the process of the present invention was carried out (i.e., using the apparatus of the present invention), the resulting polymer showed decreased degradation when compared to polymer processed by the finishing apparatus of the prior art. This improvement relates both to thermal degradation, which leads to gel formation (cross linking) and to thermally-induced oxidative degradation, which leads to discoloration.

Additional advantages and modifications will readily occur to those skilled in the art. The invention in its broader aspects is, therefore, not limited to the specific details, representative apparatus and illustrative Examples shown and described. Accordingly, departures may be made from such details without departing from the spirit or scope of the general inventive concept as defined by the appended claims and their equivalents.

What is claimed is:

1. In a continuous process for preparing a synthetic, linear, fiber-forming polyamide by the melt polymerization of an aqueous solution of a polyamide-forming salt of an aliphatic diamine and a dicarboxylic acid, the improvement comprising the step of processing the polyamide in an apparatus comprising a transfer screw disposed adjacent an outlet of an agitator section, a spiral ribbon extending upwardly from the transfer screw, a ring disposed vertically above the spiral ribbon and at least one baffle disposed vertically above the spiral ribbon and connected to the ring to thereby mix, finish and de-volatize the polyamide.

2. The process of claim 1, wherein the processing step includes the sub-step of vacuum finishing and separating the polyamide in one stage.

3. The process of one of claims 1 or 2, wherein the synthetic, linear, fiber-forming polyamide is polyhexamethylene adipamide.

* * * * *